United States Patent Office 3,174,277
Patented Mar. 23, 1965

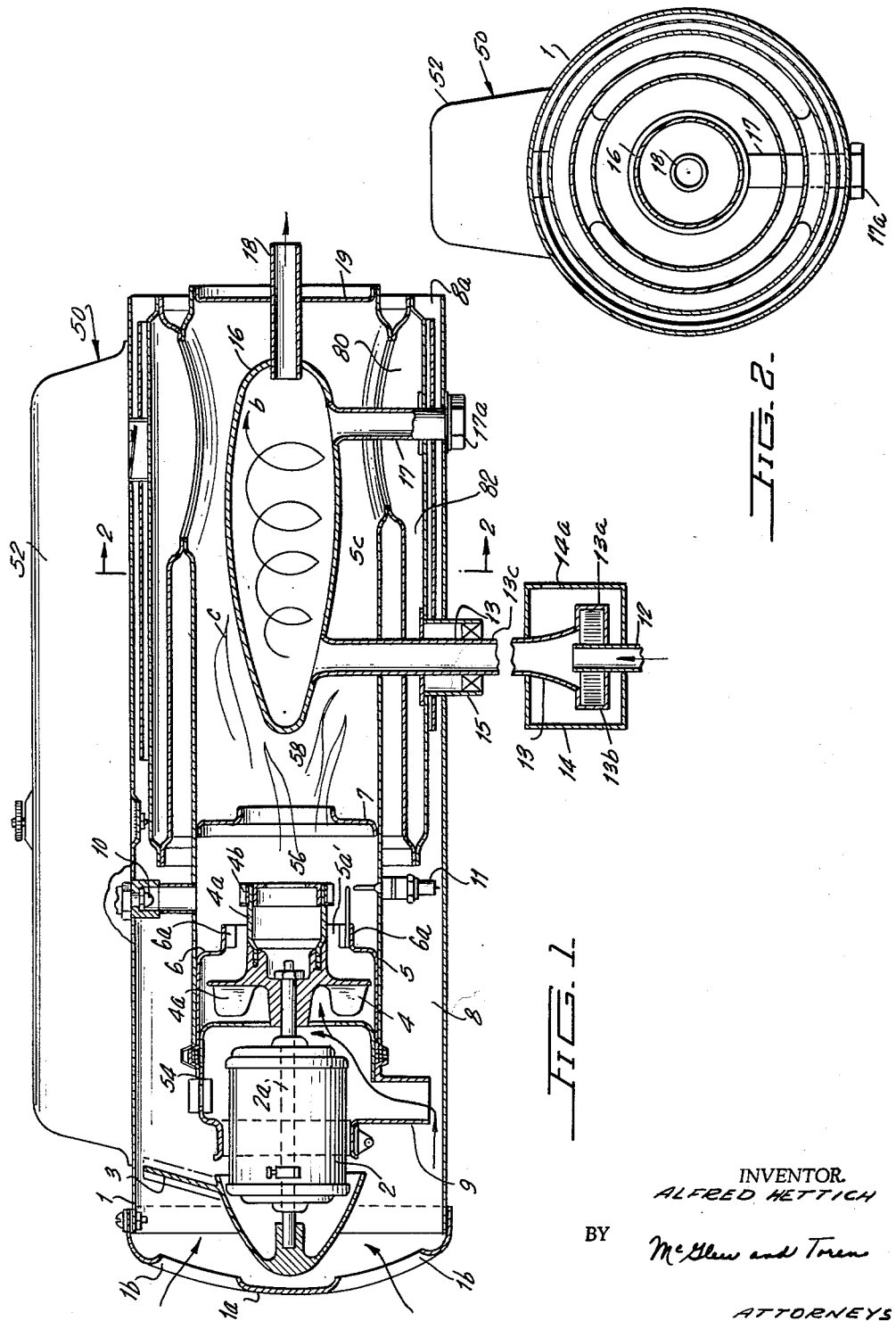

3,174,277
EXHAUST GAS DETOXICATING DEVICE
Alfred Hettich, Esslingen (Neckar), Germany, assignor to
Firma J. Eberspächer, Esslingen (Neckar), Germany
Filed Oct. 5, 1962, Ser. No. 228,716
Claims priority, application Germany, Oct. 5, 1961,
E 21,760
12 Claims. (Cl. 60—30)

This invention relates in general to exhaust gas detoxicating devices or devices for removing undesirable constituents from exhaust or waste gases from combustion engines, particularly internal combustion motors of motor vehicles, and in particular to a new and useful combination space heater and exhaust gas decontaminating means.

The invention has particular application for employment with motor vehicles having an internal combustion engine power means with means for burning a fuel in the presence of air, and thereafter discharging exhaust gases. Such exhaust gases contain undesirable constituents which cause air pollution, and it is very desirable that such constituents be removed from the gases before they are discharged to the atmosphere.

The present invention includes means for aiding an after-combustion of the unburned waste gas components, and this is accomplished in accordance with the invention in combination with means for heating the interior space of the vehicle.

With known after-combustion type waste gas treatment devices, it is common to mix the waste gases with a fresh supply of combustion air and re-ignite these gases with a spark plug or similar ignition device, or even with an open flame. In some instances electrical heating devices are employed for insuring the after-combustion. A disadvantage of the employment of additional combustion air under pressure is that considerable expenditure of power must be employed for the operation of a compressive blower or the like to supply the air, and in the case of electrical heating resistances large amounts of electrical currents are required. Electrical resistances are usually not employed for heating devices, particularly in motor vehicles, for the reasons that the heating energy requirements are excessive.

In accordance with the present invention, a combination space heating device, which includes means for burning fuel in a central combustion chamber and directing space heating air in heating exchange therewith, is employed in combination with means for removing the impurities from the waste gases of a combustion engine by completing the combustion thereof. In accordance with the invention, "after-combustion" of the waste gases is effected, which is advantageously arranged within the open flame combustion chamber of a space heater. The waste gas combustion chamber is advantageously arranged to be positioned directly in the path of the open flame cone which is generated within the space heater combustion chamber and which remains at a red hot high temperature condition. In order to withstand the high temperatures which exist in the space heater combustion chamber, the portion of the waste gas combustion chamber adjacent the open flame is formed from a material which is resistant to extremely high temperatures.

In accordance with one embodiment of the invention, the waste gas combustion chamber is arranged concentrically within the combustion chamber of the space heater, and it is formed of a configuration which enlarges in a direction away from the center of the open flame in the space heater combustion chamber. The waste gas combustion chamber forms a deflecting baffle in the path of the flame formed in the space heater combustion chamber, and also forms an ever increasing heat exchange surface extending away from the open flame. For this purpose the waste gas combustion chamber is advantageously made of a generally conical shape enlarging in a direction extending away from the location of the end of the flame cone produced in the space heater combustion chamber.

A feature of the construction is that the waste gases are directed tangentially into the conically shaped waste gas combustion chamber and they flow with a high velocity in a whirling movement in intimate contact with the high temperature wall of the combustion chamber which is positioned adjacent the open flame in the space heater combustion chamber. Due to the cyclonic action of the waste gases, solid waste gas particles are separated, and these particles are connected at the lowermost portion of the combustion chamber and may be separately removed therefrom during periodic cleaning. The waste gas exit pipe for cleaning purposes is advantageously directed outwardly in a downward direction and is closed at this end by a screw plug or closure. The waste gases are advantageously directed to the waste gas combustion chamber by means of a downwardly or upwardly directed pipe which extends through the space heater combustion chamber and connects into the waste gas combustion chamber adjacent one end. The surface of the waste gas combustion chamber is advantageously enlarged for heat exchange purposes by proper shaping, such as the formation of depressions, corrugations and the like, for obtaining optimum heat exchange.

The waste gas combustion chamber, in a preferred arrangement, is made up from two dish-shaped half sections which are preferably connected together by means of pipe connections. In order to connect the two dish-halves together, upstanding flanges are advantageously provided. The separating line between the dish halves with the flange advantageously extends in a helical or screw-like manner along the burner axis. In this manner, a whirling of the flame cone within the waste gas combustion chamber is obtained, along with a further increase in the heat exchanging effect.

A feature of the space heater construction is that it may be simply switched over during summer months when space heating is not required to minimum heating output, so that only after-combustion of the waste gases takes place. However, the heat which is generated by such after-combustion may be used for heating the motor vehicle during the winter months, and such after-combustion functions to aid in the heating which is effected by the space heater. In the summer months, the heat may advantageously be used for a refrigeration or air conditioning device which operates on high temperature gases, for example.

Accordingly, it is an object of this invention to provide an improved means for removing contaminant substances from waste gases generated by combustion engines.

A further object of the invention is to provide a device for burning waste gases from internal combustion engines, which includes a combustion chamber arranged in a high temperature zone, into which the waste gases are directed, preferably at high whirling velocities.

A further object of the invention is to provide a combination space heater and combustion gas after-burning device which includes an after-combustion chamber formed within the space heater in the location of the space heater combustion chamber.

A further object of the invention is to provide a combination space heater and device for removing the undesirable constituents of gases generated by an internal combustion engine, which includes a conically shaped combustion chamber arranged in the combustion space of the space heater, with the walls diverging in a direction away from the location of the open flame in the space heater combustion chamber, and including means for directing the waste gases from the combustion engine tangentially into the waste gas combustion chamber, the space heater including means for directing heating air in heat exchange relationship with the high temperature gases generated by the burning of fuel in the space heater combustion chamber and in the waste gas after-combustion chamber.

A further object of the invention is to provide a method of treating waste gases from an internal combustion engine, comprising directing the gases at high whirling velocities into a combustion chamber located in a high temperature zone.

A further object of the invention is to provide a device of the character described which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a longitudinal section of a combination space heater and combustion gas treatment device constructed in accordance with the invention; and FIG. 2 is a section taken on the line 2—2 of FIG. 1.

Referring to the drawing in particular, the invention embodied therein includes a combination space heater and combustion engine exhaust gas decontaminating device generally designated 50 which includes a substantially cylindrical casing 1 having an upper housing portion 52 accommodating the various control elements (not indicated).

Centrally mounted within the casing 1 is a motor casing 54 in which is supported an electric motor 2 having a driving shaft 2a which extends outwardly in each direction. On one end of the shaft 2a there is provided a blower wheel 3 which draws in both combustion and space heating air through a cover plate member 1a arranged at one end of the casing 1 and having cylindrical openings 1b defining air inlets.

On the opposite extension of the shaft 2a there is provided a combination combustion air blower and fuel atomizing element generally designated 4. A motor casing 54 is supported at one end of an inner cylindrical casing 5 arranged within the outer casing 1 and defining a pre-combustion chamber 56 and a main combustion chamber 58, which are separated by a nozzle member 7.

Air which enters through the openings 1b is circulated within the casing 1 between the motor casing 54 and the outer casing 1 and between the combustion casing 5 and the outer casing 1. A portion of this air is drawn in through a combustion air inlet 9 by vane elements 4a of the member 4 which whirls the combustion air outwardly and then radially inwardly through an air nozzle 6 having blade elements 6a for directing the air tangentially into the combustion space 56. Fuel is admitted in a jet spray from the fuel nozzle 10 and is directed against a cylindrical atomizing member 4a formed as a portion of the member 4 which is rotated with the shaft 4a by the electric motor 2. The cylindrical atomizer 4a includes a projecting portion having spaced tooth elements 4b against which the fuel is directed by the nozzle 10, and rotation thereof causes the breaking up of the fuel particles into fine atomized mist and intermixed with the whirling air which is directed outwardly through the vanes 6a. The atomized fuel which is intermixed with the combustion air is ignited by a spark plug 11 mounted in the casing wall 5. The portion of the air which bypasses the inlet 9 moves along the annular space 8 and in intimate heat exchange contact with spirally extending combustion chamber walls formed as outward radial extensions of the casing 5 from the remote end of the combustion chamber 58. The air which is thus heated is then directed outwardly through an annular discharge 8a which connects to a conduit for supplying the heated air to a compartment of the vehicle, for example.

In accordance with the invention, an exhaust pipe 12 which contains exhaust gases supplied from a combustion engine (not shown) is surrounded at its discharge end with a collection nozzle member 13 which includes an enlarged annular portion 13a having an opening 13b through which air is sucked by the discharge of the gases into a flanged portion of the nozzle 13. A casing 14 is arranged around the nozzle 13 and is provided with an opening 14a for the passage of air. The casing 14 is provided to dampen any suction sounds or noises caused by the drawing in of the air into the nozzle 13. The injection device is advantageously connected directly to the exhaust gas muffler of the internal combustion engine (not shown). The nozzle 13 has a conduit extension 13c which is directed through a tubular packing member 15 and the casing 1 and the spiral extensions of the casing 5 and connects tangentially into a waste gas after-burning combustion chamber 16 which is advantageously shaped in the manner of a conoid. The exhaust gases thus directed are whirled in an advancing spiral, as indicated by the arrow b, in a cyclone-like manner. The whirling causes the solid particles to impinge against the outer wall of the combustion chamber element 16, and the heavier particles fall by gravity toward and into a discharge pipe 17 located in a low portion of the combustion chamber 16 and leading outwardly through the casing 5 and the casing 1. The outer end of the discharge pipe 17 is capped by a screw plug or cap member 17a. The solid waste gas components may thus be easily removed periodically during the operation of the device.

The exhaust from the gases which are burned in the combustion chamber element 16 is directed outwardly through a discharge conduit or pipe 18 which extends through an end wall 19 of the casing 1.

The exhaust gases of the space heater which are found in the combustion space 56 move into the after-combustion chamber 58 and thence radially outwardly through an opening 80 for circulation through a spirally extending passage 82 which discharges outwardly, for example to the atmosphere, through a conduit (not shown) which connects to the passage 82 from outside the casing 1.

The output of the heating device which includes the means for controlling the speed of the electric motor 2 and the discharge of fuel through the nozzle 10, can be regulated in a stepless manner between two limit values. During summer operation, a minimum limit value is adjusted so that the waste gas after-combustion chamber element 16 will become red hot, but insuring that the hollow cone of the flame generated in the after-combustion chamber space 58, as indicated by the letter c, is arranged adjacent the apex of a conical portion, so that this end is maintained at the highest temperature. For this reason at least this portion of the combustion chamber element 16 is made of a material which is very resistant to high temperature conditions. In addition, this portion is made with a minimum size with the walls diverging outwardly in a direction away from the flame generated in the space 58.

By maintaining the combustion chamber element 16 at the high temperature effected by the burning of the gases in the combustion space 58, the exhaust gases within the combustion chamber element 16 are ignited, and any residual gases in the waste gases will be burned. The purified waste gases exit through the conduit 18, either directly into the ambient atmosphere, or they are supplied to an additional detoxicating device, for example one working with a catalyst (not shown).

During winter operation, when space heating is required, the heating air which is supplied to the heater continues through the annular space 8 and is enriched not only with the heating energy which is developed by burning of the gases within the casing 5, but also by the heating energy which is developed by the after-combustion of gases in the after-combustion chamber element 16.

The after-combustion chamber 16 is advantageously formed with a corrugated or spirally-formed outer surface to increase the heat transfer area between the interior and exterior of the element 16. The surface may also be specially contoured to provide for smooth flow of the gaseous products of combustion therearound and a smooth spiral configuration is preferable.

In some instances, it is desirable to arrange the fresh air suction ejector formed by the nozzle 13 surrounding the discharge end of the exhaust pipe 12 in a space communicating with the annular discharge 8a of the space heating air, so that the air may be initially heated.

The heating device, including the casing 1, acts as a muffler for the exhaust gases in addition to the beneficial effects on the waste gases in respect to the removal of the undesirable constituents thereof. An advantage of employing air which is already preheated by the space heater for introduction with the waste gases at the location of the nozzle 13 is that it insures that the temperature of the exhaust gases is not reduced to a temperature which will hinder the after-combustion thereof.

In some instances it is desirable to form the combustion chamber element 16 and the hot portion of the conduit 13c as a continuous heating coil which extends through the combustion chamber 58.

While specific embodiments of the invention have been shown and described in detail to illustrate the application of the inventive principles, it will be understood that the invention may be embodied otherwise without departing from such principles.

What is claimed is:

1. A device for heating exhaust gases generated in a combustion engine, comprising a space heater including an outer casing, means for drawing combustion air and space heating air into said outer casing, an inner casing within said outer casing defining a combustion chamber, means in said inner casing for receiving combustion air from said outer casing and for mixing fuel with said combustion air and for igniting said fuel and air mixture to generate high temperature gases within said combustion chamber, means defining a discharge path for the high temperature gases leaving from said combustion chamber and extending through the space between said inner and outer casings, means defining a waste gas after-combustion chamber within said inner casing at a location of the high temperature gases formed therein but not directly connected thereto, and means for directing the space heating air drawn into said outer casing between said inner and outer casing and into heat exchange relationship with the means defining a path for the high temperature gases and for directing said air outwardly from said outer casing for space heating purposes, and means for directing exhaust waste gases into said after-combustion chamber for heating the exhaust waste gases indirectly to effect complete combustion thereof.

2. A device according to claim 1, wherein said means for directing gases into said means defining an after-combustion chamber includes conduit means to direct the waste gases tangentially into said after-combustion chamber.

3. A device according to claim 1, wherein said means for directing combustion gases into said after-combustion chamber includes a conduit, an injector nozzle formed around said conduit for drawing in combustion air into said exhaust gases for delivery to said after-combustion chamber.

4. A device for treating exhaust gases generated in a combustion engine, comprising a space heater including an outer casing, means for drawing combustion air into said casing, means in said casing for mixing fuel with said combustion air and for igniting said fuel and air mixture to generate high temperature gases within said casing, means for directing air for space heating into heat exchange relationship with the high temperature gases, means defining a waste-gas after-combustion chamber within said casing at a location of the high temperature gases formed therein but not directly connected thereto, said after-combustion chamber being substantially conoidal and having an apex adjacent the high temperature portion of the gaseous products generated in said casing, and means for directing exhaust waste gases into said after-combustion chamber for heating the exhaust waste gases indirectly to effect complete combustion thereof.

5. A combination space heater and internal combustion engine waste gas detoxicating device, comprising a tubular casing having an inlet opening for combustion air and space heating air at one end, and a discharge opening for space heating air at an opposite end, an inner casing defined in said casing defining a combustion chamber, means for drawing air through said casing and for directing air into said combustion chamber, means for admixing fuel to said combustion air and for igniting it in said combustion chamber, a waste gas after-burning combustion chamber element located within said combustion chamber at a location subject to the high temperatures of the gaseous products of combustion formed by igniting the fuel and air mixture within said combustion chamber, and means for directing waste gases into the interior of said after-combustion chamber element for burning therein under heating by the high temperature gaseous products of combustion in said combustion chamber.

6. The combination space heater and waste gas detoxicating device according to claim 5, wherein said means defining a waste gas after-combustion chamber element includes a substantially conoidal-shaped casing located within said inner casing defining said combustion chamber.

7. A combination space heater and waste gas detoxicating device according to claim 5, wherein said means for directing exhaust gases into said waste gas after-burner combustion chamber element includes a conduit connected tangentially into said element for whirling the exhaust gases tangentially against the interior walls thereof.

8. A combination space heater and waste gas detoxicating device according to claim 7, including a nozzle formed at one end of said conduit having a widened annular portion with an opening for combustion air, and an exhaust pipe for the waste gases extending into said nozzle in a manner to cause the sucking in of combustion air into the exhaust gases which are delivered to said conduit.

9. A combination space heater and waste gas detoxicating device according to claim 5, wherein said waste gas after-burner combustion chamber element includes a discharge connection formed at the lower portion thereof for collecting solid materials therein.

10. A combination space heater and waste gas detoxicating device comprising a space heater including an outer tubular casing, an inner tubular casing including a portion defining a pre-combustion chamber and a portion defining a main combustion chamber, said inner casing including walls defining a passage extending radially outwardly from said main combustion chamber for the discharge of gaseous products of combustion, means in said casing for circulating heating air between said inner and outer casings and for circulating combustion air into said inner casing to said pre-combustion chamber, means for directing fuel into said combustion chamber for mixing with said combustion air, means for igniting said fuel and air mixture to cause open combustion and the generation of gaseous products of combustion and to direct said products into said main combustion chamber, wall means defining a waste gas after-combustion chamber within said main combustion chamber, a conduit for directing exhaust gases into said after-combustion chamber, and means for admixing air to said exhaust gases connected to said conduit.

11. A device according to claim 10, including a conduit connected to said after-combustion chamber at the lowest portion thereof for collecting solid particles from the waste gases burned in said after-combustion chamber.

12. A device according to claim 10, wherein said after-combustion chamber includes a conical end portion adjacent the gaseous products of combustion generated in said main combustion chamber of a material to withstand extremely high temperatures.

References Cited by the Examiner

UNITED STATES PATENTS

| | | | |
|---|---|---|---|
| 2,956,865 | 10/60 | Williams | 60—30 X |
| 3,008,642 | 11/61 | Kofink et al. | 237—12.3 |
| 3,056,662 | 10/62 | Ridgway | 60—30 X |

JULIUS E. WEST, *Primary Examiner.*